(12) United States Patent
Gretz

(10) Patent No.: US 9,739,465 B1
(45) Date of Patent: Aug. 22, 2017

(54) SCONCE BOX ASSEMBLY FOR SHALLOW WALL CAVITIES AND VARIOUS WALLBOARD THICKNESSES

(71) Applicant: Arlington Industries, Inc., Scranton, PA (US)

(72) Inventor: Thomas J. Gretz, Port St. Lucie, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 318 days.

(21) Appl. No.: 14/690,384

(22) Filed: Apr. 18, 2015

Related U.S. Application Data

(60) Provisional application No. 61/984,151, filed on Apr. 25, 2014.

(51) Int. Cl.
  *F21V 21/26* (2006.01)
  *F21S 8/00* (2006.01)
  *F21V 23/00* (2015.01)
  *F21V 21/02* (2006.01)

(52) U.S. Cl.
  CPC ............. *F21V 21/26* (2013.01); *F21S 8/036* (2013.01); *F21V 21/02* (2013.01); *F21V 23/00* (2013.01)

(58) Field of Classification Search
  CPC .......... F21V 21/26; F21V 21/02; F21V 23/00; F21S 8/036
  USPC ........................................... 362/147; 174/668
  See application file for complete search history.

(56) References Cited

U.S. PATENT DOCUMENTS

| | | | |
|---|---|---|---|
| 7,525,043 B1 * | 4/2009 | Gretz ..................... | H02G 3/123 174/480 |
| 8,148,635 B1 * | 4/2012 | Gretz ..................... | H02G 3/123 174/481 |
| 8,212,144 B1 * | 7/2012 | Gretz ...................... | H02G 3/12 174/480 |
| 8,445,779 B1 * | 5/2013 | Gretz ..................... | H02G 3/123 174/480 |

* cited by examiner

*Primary Examiner* — Timothy Thompson
*Assistant Examiner* — Charles Pizzuto

(57) ABSTRACT

A sconce box assembly for mounting sconces on walls of various wallboard thicknesses and shallow wall cavities with no disruption to the surrounding wall. The sconce box assembly includes an electrical box having a sidewall, a back wall, an electrical cavity, and wing bosses extending from the sidewall. First rotatable wings secured to the wing bosses are adapted for rotation between a retracted position, in which the rotatable wings are positioned inside the sidewall perimeter, and an extended position in which the rotatable wings are positioned outside the sidewall perimeter. Retracting the wings facilitates insertion of the electrical box through a hole in a wall. Extending the wings facilitates tightening the wings and clamping the electrical box to the wallboard. The invention contemplates at least one second rotatable wing that may be used optionally in place of the first rotatable wing in order to accommodate attachment to various thicknesses of wallboards.

20 Claims, 8 Drawing Sheets

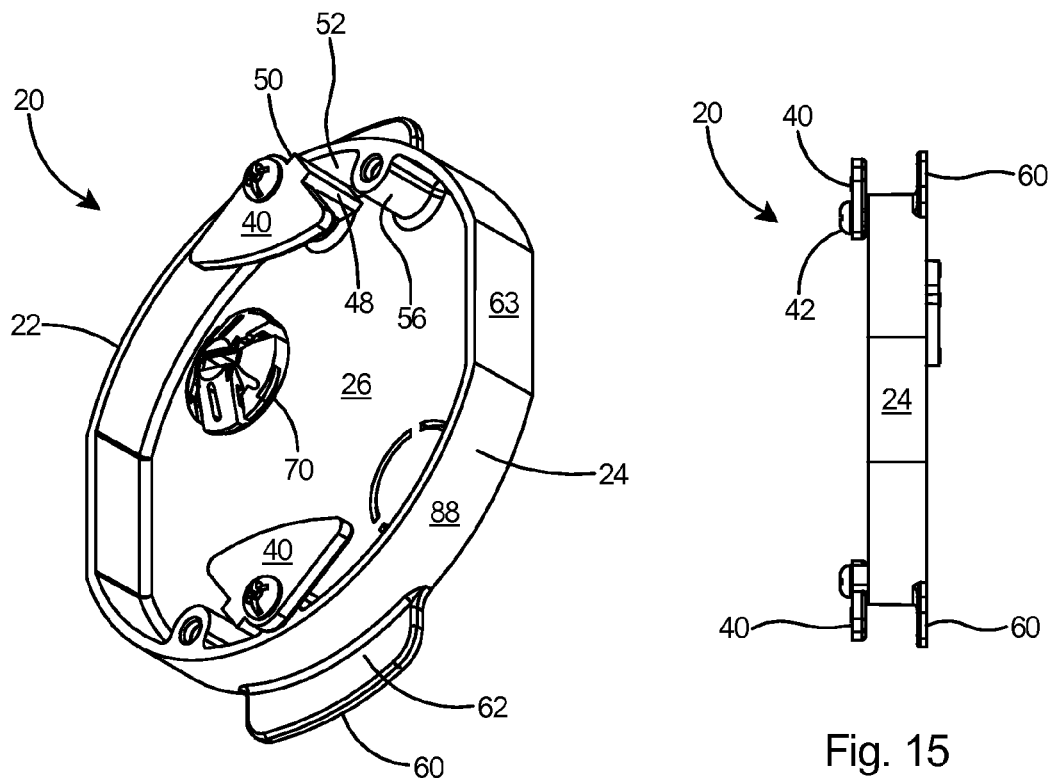
Fig. 14
Fig. 15
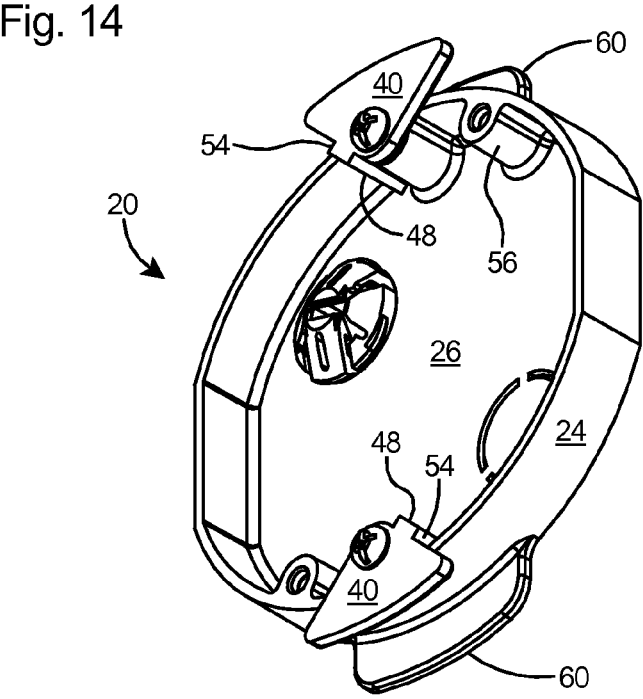
Fig. 16

SCONCE BOX ASSEMBLY FOR SHALLOW WALL CAVITIES AND VARIOUS WALLBOARD THICKNESSES

CROSS-REFERENCE TO RELATED APPLICATIONS

This application claims priority to provisional U.S. Application No. 61/984,151, filed Apr. 25, 2014, the contents of which are incorporated herein by reference in their entirety.

FIELD OF THE INVENTION

The present invention relates to mounting of electrical components to walls and specifically to a sconce box assembly for securing a sconce light to a wall having a shallow wall cavity.

BACKGROUND

It is common for homeowners to remodel or upgrade bathrooms, kitchens, and other areas of their homes. Usually, the homeowner desires to add additional lighting or upgrade the existing lighting as part of the remodeling project. As the project involves reworking an existing or "old" home, this is typically termed an old work situation.

Usually a conventional sconce box is used to provide an electrical enclosure and a mounting surface for installing the new sconce light. Conventional sconce boxes are typically constructed to fit a standard wall cavity, which is typically constructed with 2×4-inch studs and includes a spacious 3.5-inch wall cavity.

Unfortunately, especially in an old work situation, the wall cavity at the desired location of the new sconce is sometimes severely reduced by existing water pipes, electrical cables, or similar devices within the interior wall cavity. The installer therefore must typically remove a substantial portion of the existing wallboard, reroute the piping through the wall cavity, and then replace the wallboard. This leads to a substantially higher installation time and installation cost.

Accordingly, what is needed is an apparatus and method for quickly securing a wall sconce to a wall, and especially an apparatus and method that enables the installing of a sconce light to a section of wall in which the interior wall cavity is substantially reduced by interior piping or similar obstructions.

BRIEF SUMMARY OF THE INVENTION

The present invention is a sconce box assembly that is adaptable to mounting on walls of various wallboard thicknesses and with shallow wall cavities with no disruption to the surrounding wall. The sconce box assembly includes an electrical box having a sidewall, a back wall, an electrical cavity, and wing bosses extending from the sidewall. First rotatable wings secured to the wing bosses are adapted for rotation between a retracted position in which the rotatable wings are positioned inside the sidewall perimeter, and an extended position in which the rotatable wings are positioned outside the sidewall perimeter. Retracting the wings facilitates insertion of the electrical box through a hole in a wall and extending the wings facilitates tightening of the wings thereby clamping the electrical box to the wallboard. The invention contemplates at least one second rotatable wing that may be used optionally in place of the first rotatable wing in order to accommodate mounting to thicker wallboards.

OBJECTS AND ADVANTAGES

A first object of the invention is to enable the mounting of a sconce device or similar electrical fixture to a wall in substantially any location, including areas that have substantially shallow wall cavities within the wall.

A second object of the invention to simplify the mounting of a sconce to a wall by enabling the installer to avoid removing existing wallboard and rerouting piping within the wall cavity and the subsequent task of repairing the damaged wall.

A further object of the invention is to reduce the time and cost involved in mounting a sconce to a wall.

A further object of the invention is to provide an apparatus and method that enables the installing of a sconce light to a section of wall in which the interior wall cavity is substantially reduced by interior piping or similar obstructions.

A further object of the invention is to provide a sconce box assembly that is adaptable for mounting to walls of various thicknesses.

A further object of the invention is to provide a sconce box assembly that reduces the number of stock keeping units (SKUs) required to be kept on hand for various wall thicknesses.

BRIEF DESCRIPTION OF THE SEVERAL VIEWS OF THE DRAWING(S)

Reference is made herein to the accompanying drawings, which are not necessarily drawn to scale, and wherein:

FIG. 14 is an isometric view of a first embodiment of a sconce box assembly including the first wings rotated to a retracted position.

FIG. 15 is a side view of the sconce box assembly of FIG. 14 with the first wings rotated to an extended position.

FIG. 16 is an isometric view of the sconce box assembly of FIG. 14.

DETAILED DESCRIPTION

Figure 1:
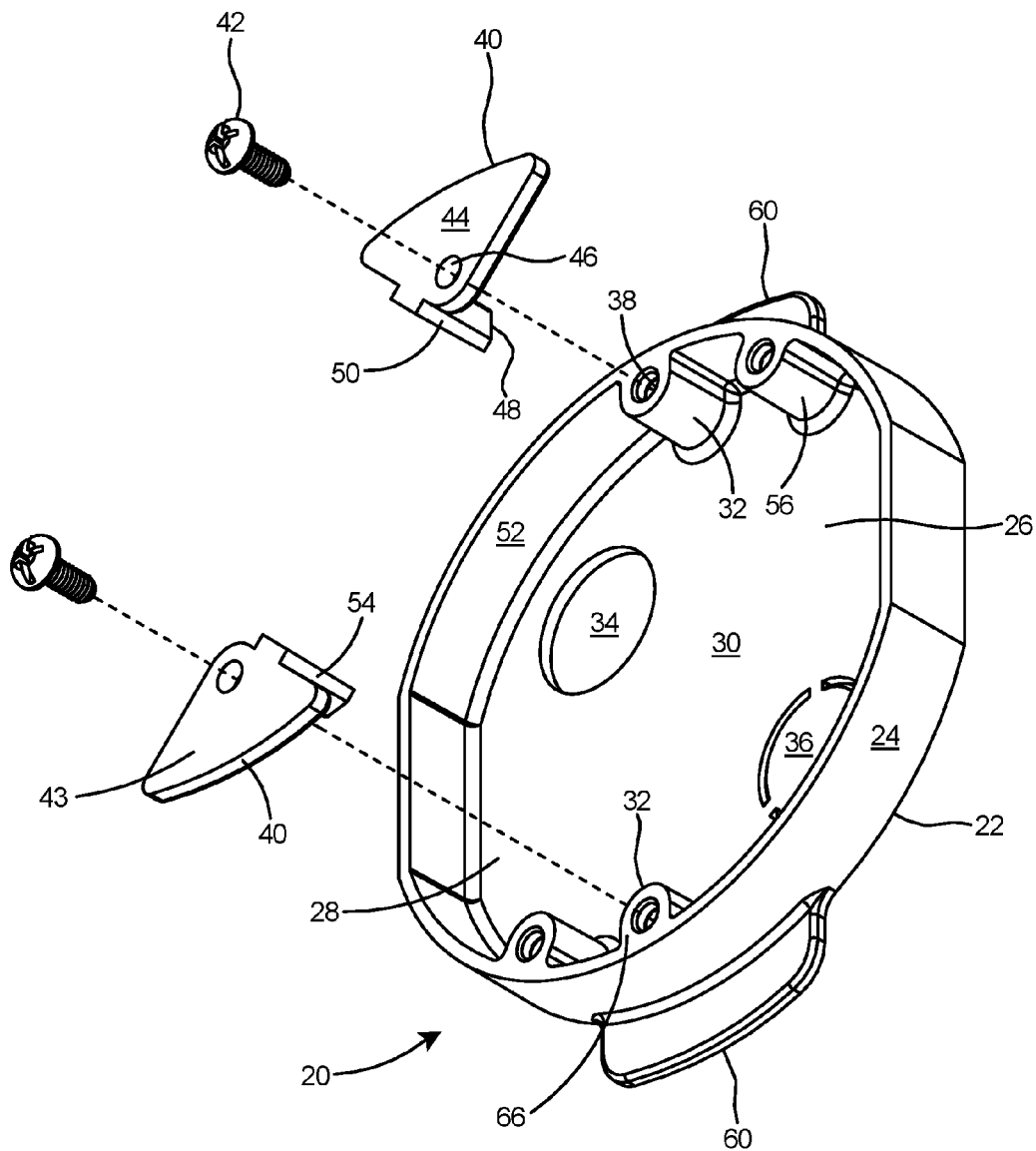
FIG. 1 is an exploded isometric view of a sconce box assembly in accordance with embodiments of the invention.

With reference to FIG. 1, the present invention comprises a sconce box assembly 20 for securing a light fixture or similar device to a wall. The sconce box assembly 20 includes an electrical box 22 having a sidewall 24 and a back wall 26 forming an electrical cavity 28. The back wall 26 includes an inner surface 30. Two wing bosses 32 are integral with the sidewall 24 and inner surface 30 of the back wall 26. Back wall 26 may include one or more openings 34 or knockout areas 36 therein.

The wing bosses 32 include bores 38 therein and sconce box assembly 20 includes a first rotatable wing 40 secured within the bore 38 of the wing boss 32 by a self-threading fastener 42 such as the screws shown in FIG. 1. In the embodiment shown in FIG. 1, the first wings 40 include a main body portion 43 including a planar top surface 44, an aperture 46 therein, and a stop arm 48. When assembled to the electrical box 22 with fasteners 42, the rotatable wings 40 may be rotated from a retracted position, wherein a first side 50 of stop arm 48 is in contact with inner surface 52 of sidewall 24, to an extended position wherein a second side 54 of stop arm 48 is in contact with inner surface 52 of sidewall 24. As will be described hereinafter, according to the present invention, at least two embodiments of the rotatable wings may be provided with the sconce box assembly to enable the assembly to be secured to walls constructed of various conventional wallboard thicknesses. Preferably, there are two wing bosses 32 with the wing bosses preferably aligned 180° apart on the sidewall 24 of the electrical box.

Figure 3:
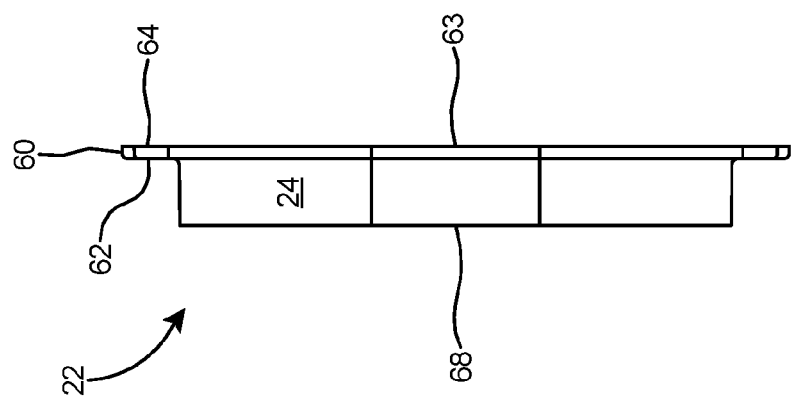
FIG. 3 is a side view of the electrical box.
Figure 2:
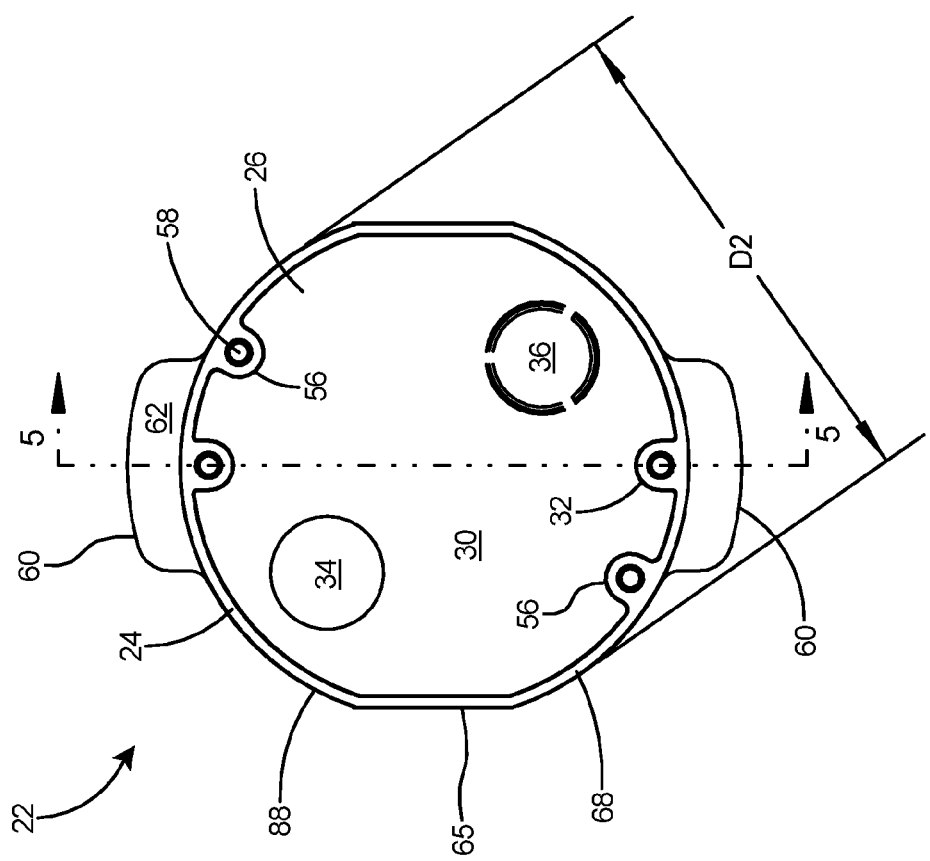
FIG. 2 is an elevation view of an electrical box which forms a portion of the sconce box of FIG. 1.

Referring to FIGS. 2 and 3, the electrical box 22 includes two fixture bosses 56 integral with the sidewall 24 and inner surface 30 of the back wall 26, with the fixture bosses preferably aligned 180° apart on the sidewall 24. The fixture bosses 56 include bores 58 therein. Two flanges 60 extend from opposing sides of the sidewall 24. The flanges 60 include a front surface 62 and a rear surface 64 and the rear surface of each flange 60 is planar with the rear surface 63 of the back wall 26. The sidewall 24 is substantially circular with two flat portions 65 aligned substantially at a 90° angle from the flanges 60. The faces 66 (see FIG. 1) of wing bosses 32 and the fixture bosses 56 are planar with the planar rim 68 of the sidewall 24.

Figure 4:
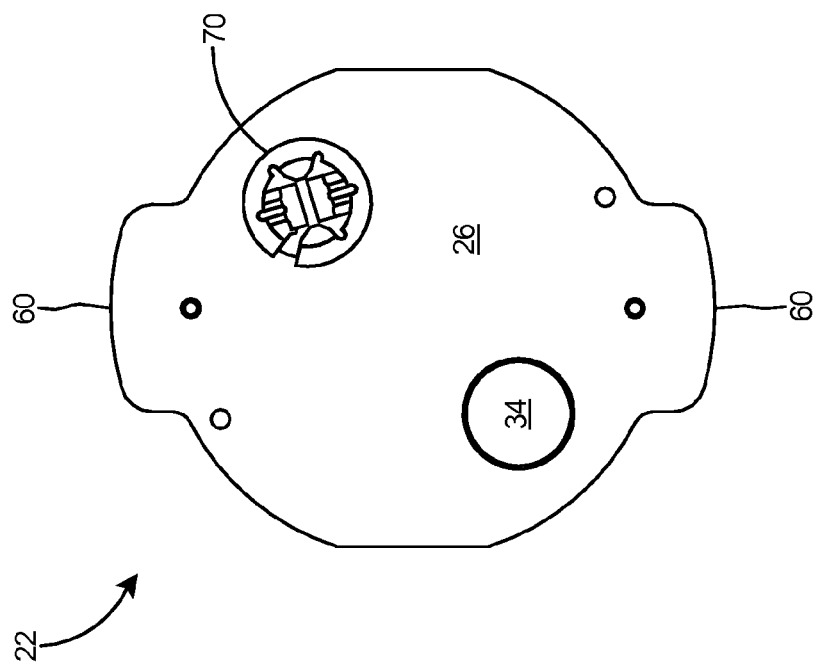
FIG. 4 is a top view of the electrical box.
Figure 6:
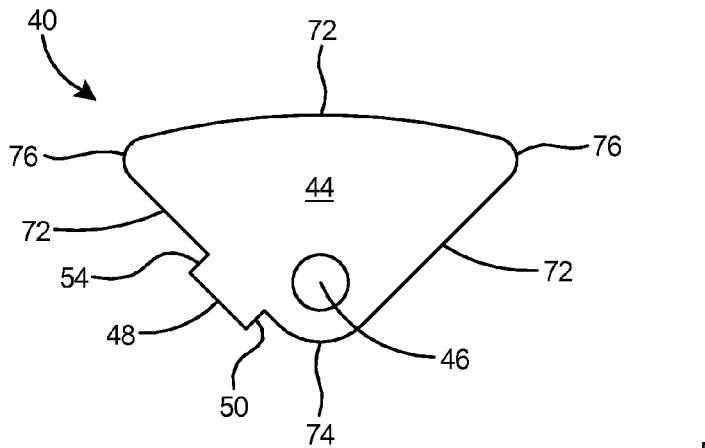
FIG. 6 is a top view of a first rotatable wing that forms a portion of the sconce box of FIG. 1.
Figure 7:
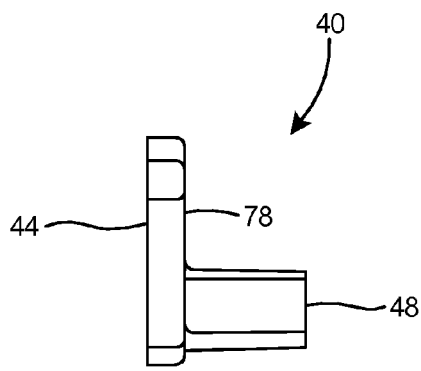
FIG. 7 is a side view of the first wing.
Figure 8:
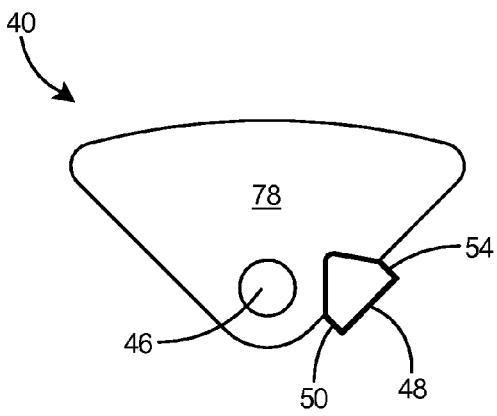
FIG. 8 is a bottom view of the first wing.
Figure 9:
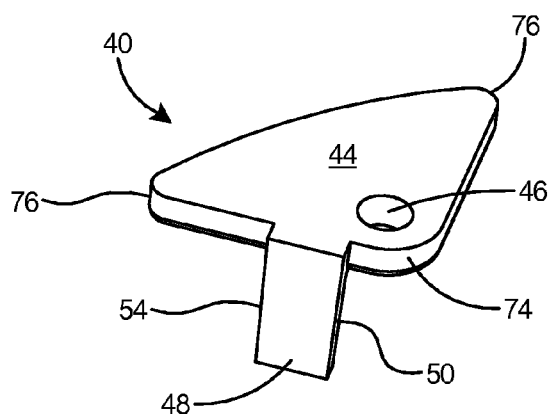
FIG. 9 is an isometric view of the first wing.
Figure 10:
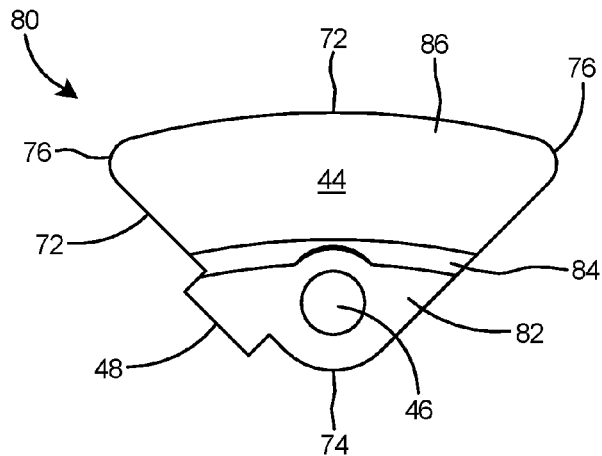
FIG. 10 is a top view of a second and alternative rotatable wing that may be used with the sconce box of FIG. 1.

As shown in FIG. 4, an electrical fitting 70 may be fitted within one or more of the openings 34 in the back wall 26 of the electrical box 22. One such electrical fitting 70 may be the Black Button® push-in fitting or connector for connecting non-metallic cable to electrical boxes. The Black Button® push-in fitting is available from Arlington Industries of Scranton, Pa. Use of the push-in fitting will enable push-in connection of a non-metallic cable (not shown) to the electrical box portion 22 of the sconce box assembly.

With reference to FIGS. 6-9, the first wings 40 include a substantially triangular profile including sides 72, a first corner 74 and two opposing corners 76. Aperture 46 is located adjacent first corner 74 and stop arm 48 extends from a side 72 of the first wing 40 substantially near the aperture 46. The stop arm 48 extends from the bottom surface 78 of the first wing 40. Stop arm 48 includes a first side 50 and a second side 54.

Figure 11:
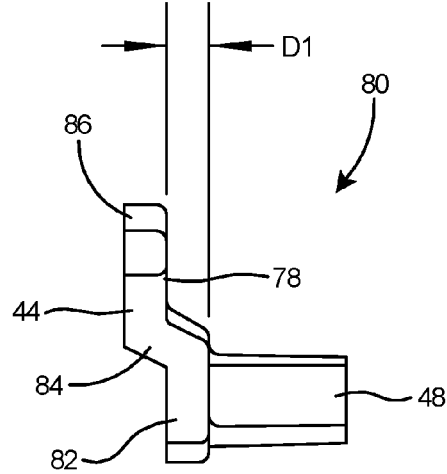
FIG. 11 is a side view of the second wing.
Figure 12:
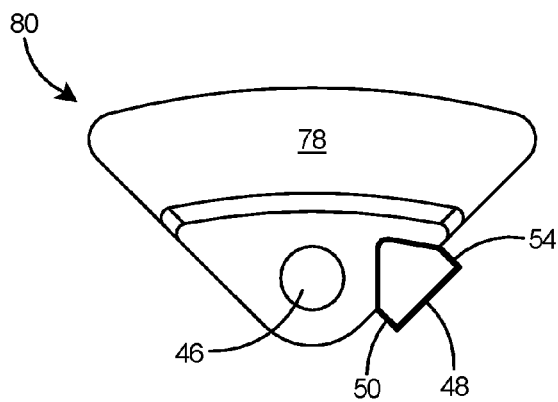
FIG. 12 is a bottom view of the second wing.
Figure 13:
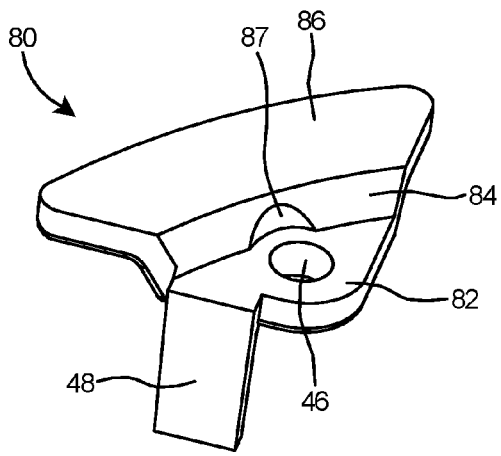
FIG. 13 is an isometric view of the second wing.

Referring to FIGS. 10-13, there is shown a second embodiment of the rotatable wings. Second wing 80 may optionally be used in place of first rotatable wing in order to accommodate attachment of the electrical box to a thicker wallboard. Optional second wing 80 is substantially similar to the first wing described hereinabove and includes the top surface 44, bottom surface 78, a substantially triangular profile including sides 72, a first corner 74 and two opposing corners 76, an aperture 46 and a stop arm 48 including a first side 50 and a second side 54. The critical difference in second wing 80 is that the top surface is not planar but includes a base portion 82, a center portion 84, and an end portion 86. End portion 86 is preferably offset from base portion 82 by distance D1 as shown in FIG. 11. Further, as shown in FIG. 13, center portion 84 of second rotatable wing 80 includes an indentation 87 therein. Thus second wing 80, as a result of the offset in the wing, can accommodate a thicker wallboard than the first wing. As in the first embodiment of the wing, stop arm 48 acts to limit the rotation of the second wing 80 with respect to the electrical box portion of the sconce box assembly. The offset D1 in rotatable wing 80 enables a single size electrical box to accommodate several nominal thicknesses of wallboard.

According to the present invention, the first wing 40 and second wings 80 are interchangeable on the electrical box 22 to form a sconce box assembly 20 appropriate for attachment to various nominal thicknesses the wallboard. Additional interchangeable wings are within the scope of the invention in order to accommodate wallboards having other nominal thicknesses.

With reference to FIGS. 14-16, a first embodiment of a sconce box assembly 20 includes the two rotatable first wings 40 assembled to the electrical box 22. The sconce box assembly 20 is operated by first cutting a substantially circular hole in the wallboard (not shown) at the preferred location on a wall. The diameter of the circular hole in the wall is preferably slightly larger than the outer diameter D2 across the circular wall portions 88 of sidewall 24 (see FIG. 2). The installer determines the thickness of the wallboard, which typically is a nominal thickness such as ½-inch or ⅝-inch.

As shown in FIG. 14, for installation on a wall, the first wings 40 are rotated to their retracted positions, with first side 50 of each of the stop arms 48 in contact with inner surface 52 of sidewall 24, and tightened sufficiently such that the stop arms 48 cannot swing freely away from the retracted position. In the retracted position, the wings 40 are retracted within the sidewall 24 of the electrical box 22. The electrical box portion 22 of sconce box assembly 20 is then slipped within the hole in the wall and pulled outwards until front surface 62 of flanges 60 is flush with the back surface of the wallboard. Flat portions 65 of the sidewall 24 enable the electrical box to slip easily within the hole in the wall.

First wings 40 are then rotated to their extended positions by turning fasteners 42 clockwise, wherein the second side 54 of stop arm 48 is in contact with the inner surface 52 of the sidewall 24, as shown in FIGS. 15 and 16, and are tightened against the sidewall 24 of the electrical box 22 until the wallboard is clamped tightly between the first wings 40 and the flanges 60. Electrical wiring (not shown) is typically pulled into the box prior to the attachment of the sconce box assembly 20 to the wall. After the sconce box assembly is secured to the wall, the leads from a light fixture, or similar wall mounted electrical device, can be secured to the electrical wiring and the electrical fixture secured by appropriate mounting plate and screws (not shown) driven into the fixture bosses 56 of the electrical box 22.

Figure 17:
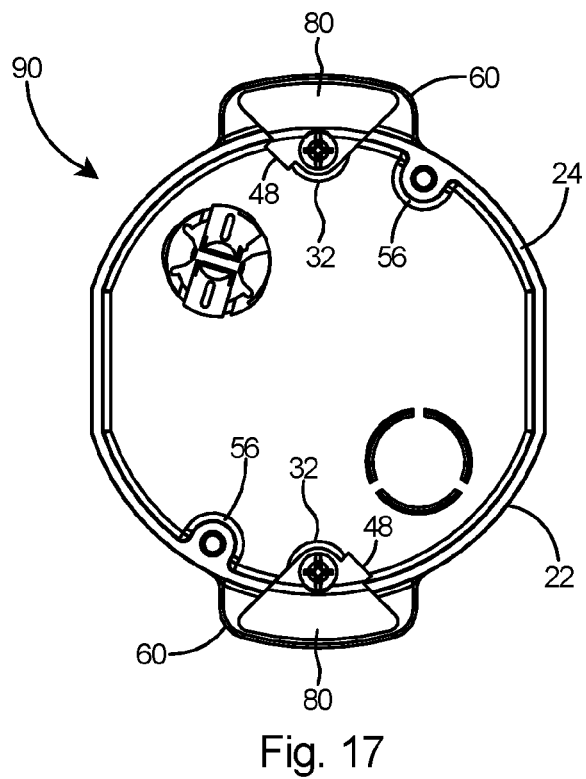
FIG. 17 is a plan view of a second embodiment of a sconce box assembly according to the present invention including the second wings rotated to an extended position.
Figure 18:
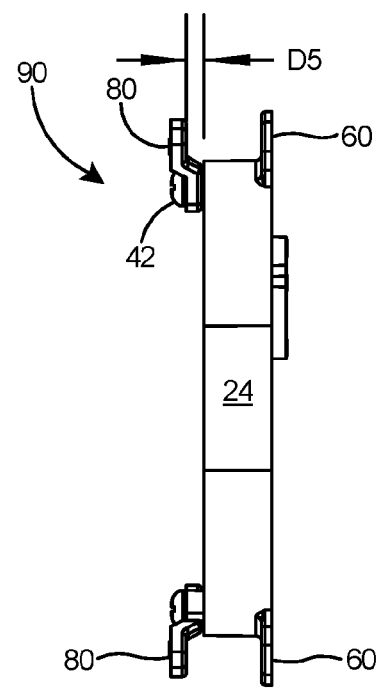
FIG. 18 is a side view of the sconce box assembly of FIG. 17.
Figure 19:
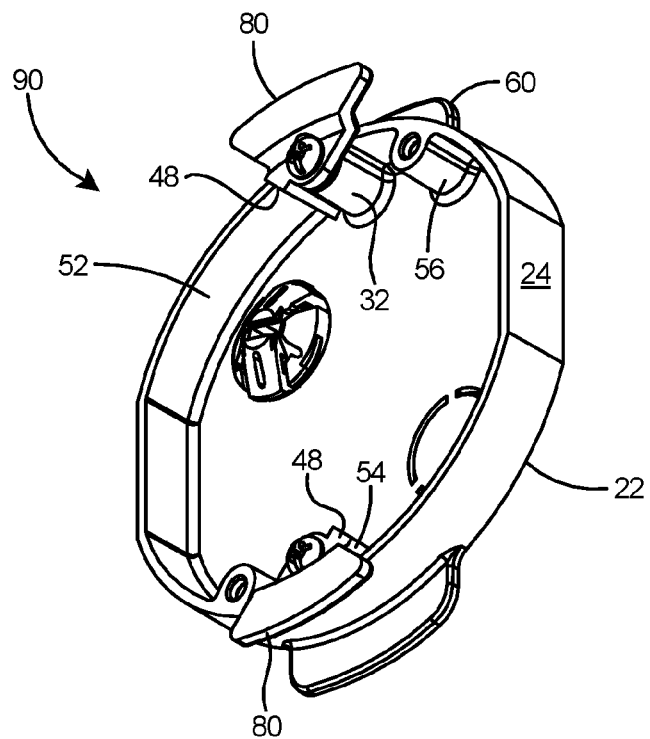
FIG. 19 is an isometric view of the sconce box assembly of FIG. 17.

Referring to FIGS. 17-19, a second embodiment of a sconce box assembly 90 is created by replacing the first wings (see FIG. 14) with the second wings 80. The wings 40 and 80 are interchangeable on the electrical box 22 to form a sconce box assembly that is appropriate for attachment to the wallboard thickness at the installation site. Second wing 80 such as shown in FIGS. 17-19 may include an offset D5 (see FIG. 18) to facilitate connection to a thicker wallboard than that accommodated by the first wing. The operation of the second embodiment of the sconce box assembly 90 is identical to the operation for the first embodiment described hereinabove, with the exception being that the second wing 80 accommodates attachment to a thicker drywall or wallboard.

One substantial advantage offered by the sconce box of the present invention is that it reduces the number of stock keeping units (SKUs) required to be kept on hand for various wall thicknesses. Although the specific embodiments described herein are directed to installation on nominal wallboard thicknesses of ½-inch and ⅝-inch, the offset D5, such as shown in FIG. 18, could be varied to accommodate other nominal wallboard thicknesses, such as ¾-inch. Thus, the sconce box assembly of the present invention is typically provided as a kit or package, with the package including electrical box 22 and at least two rotatable wings 40 and 80 to accommodate at least two thicknesses of wallboard. Thus the installer has all the components to adapt the sconce box assembly to fit substantially any nominal thickness of wallboard and does not have to transport several different sconce boxes to the job site.

Figure 20:
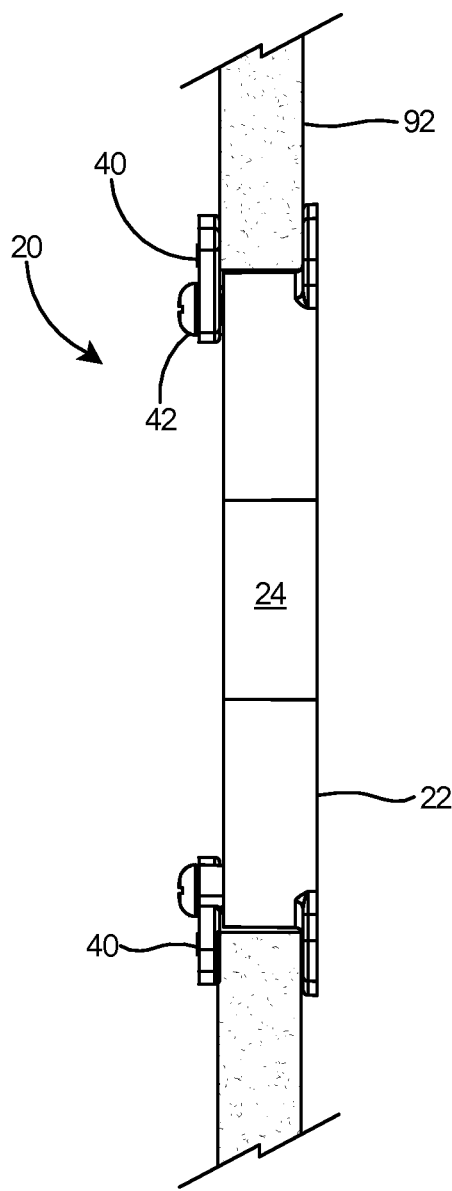
FIG. 20 is a side view of the first embodiment of the sconce box assembly secured to a wallboard.
Figure 21:
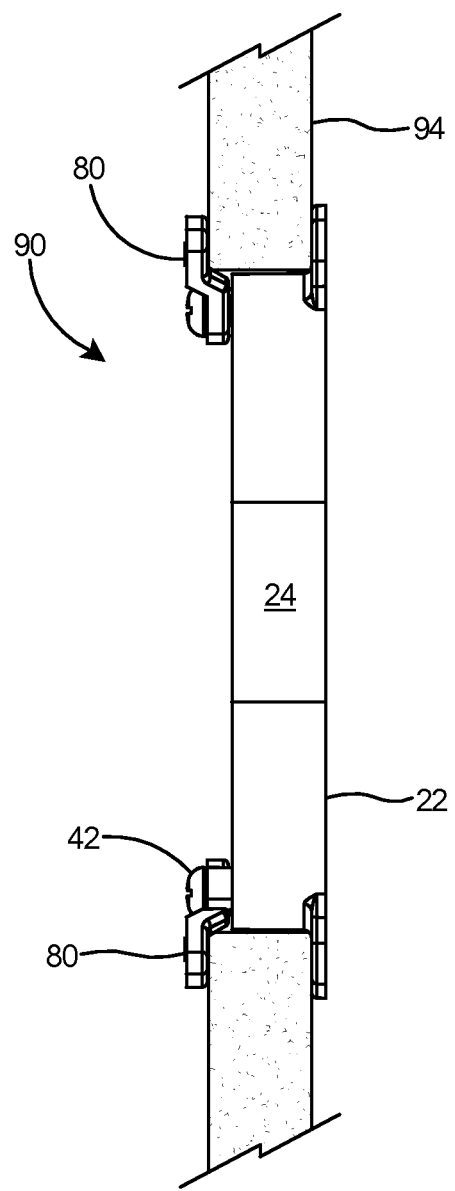
FIG. 21 is a side view of the second embodiment of the sconce box assembly secured to a wallboard.

With reference to FIG. 20, the first embodiment of the sconce box assembly 20 is shown after being secured to a drywall or wallboard 92 of a first nominal thickness. The rotatable wings 40 are rotated outward to their extended position and tightened against the sidewall 24 to clamp the electrical box 22 portion of the sconce box assembly 20 to the wall. As shown in FIG. 21, the second embodiment of the sconce box assembly 90 is depicted secured to a drywall or wallboard 94 of a second nominal thickness. The rotatable wings 80 are rotated outward to their extended position and tightened against the sidewall 24 to clamp the electrical box 22 portion of the sconce box assembly 90 to the wall.

Figure 5:
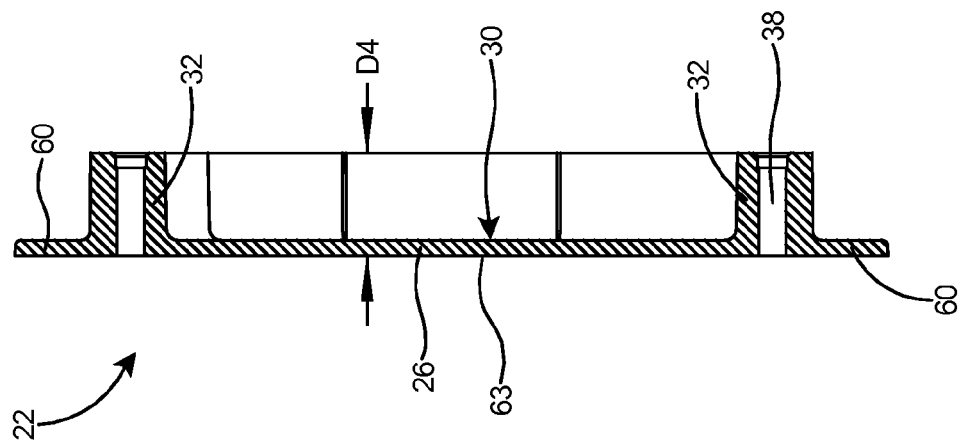
FIG. 5 is a sectional view of the electrical box taken along line 5-5 of FIG. 2.

As stated hereinabove, the sconce box assembly of the present invention provides an apparatus and method for quickly securing a wall sconce to a wall, and particularly an apparatus and method that enables the installing of a sconce light to a section of wall in which the interior wall cavity is substantially reduced by interior piping or similar obstructions. With reference to FIG. 5, the critical factors that enable the sconce box assembly to fit within a shallow wall cavity include the depth D4 of the electrical box and the fact that the rear surface 63 is flat with no structures protruding from the flat rear surface 63. The depth D4 of the electrical box is preferably no greater than 0.562 inches. The substantially shallow depth D4 of the electrical box 22 of the present invention enables the mounting of a sconce fixture in extremely shallow wall cavities, such as those locations in which water pipes or other obstructions severely limit the cavity depth available to the installer.

According to a preferred embodiment, the electrical box 22 and wings 40 and 80 are most preferably constructed of metal, such as galvanized steel, but may also be molded of plastic in one piece.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A sconce box assembly, comprising:
    an electrical box including a sidewall and a back wall defining an electrical cavity therein, said back wall including a front surface and a rear surface, and said electrical box including a wing boss having a bore therein;
    a first rotatable wing held loosely to said wing boss by a fastener;
    said rotatable wing including a front surface, a rear surface, and a stop arm extending from said rear surface; and
    two flanges extending from opposing sides of the sidewall.

2. The sconce box assembly of claim 1, wherein said flanges include rear surfaces that are flush with said rear surface of said back wall of said electrical box.

3. The sconce box assembly of claim 2, further comprising a fixture boss extending from said front surface of said back wall.

4. The sconce box assembly of claim 3, further comprising
    two of said wing bosses on said electrical box; and
    said wing bosses are aligned 180° apart on the sidewall of the electrical box.

5. The sconce box assembly of claim 3, including
    two of said fixture bosses on said electrical box; and
    said fixture bosses are aligned 180° apart on the sidewall of the electrical box.

6. The sconce box assembly of claim 1, comprising a rim on said electrical box, said rim is planar.

7. The sconce box assembly of claim 1, including an optional second rotatable wing for use in place of said first rotatable wing for attaching said electrical box to a thicker wallboard.

8. The sconce box assembly of claim 1, wherein said first rotatable wing further comprises a first corner and two opposing corners.

9. The sconce box assembly of claim 1, wherein said stop arm of said first rotatable wing further comprises a first side and a second side.

10. The sconce box assembly of claim 7, wherein said second rotatable wing comprises a base portion and an end portion.

11. The sconce box assembly of claim 10, wherein said end portion of said second rotatable wing is offset a distance from said base portion.

12. A sconce box assembly, comprising:
    an electrical box including a sidewall and a back wall defining an electrical cavity therein, said back wall including a front surface and a rear surface, and said electrical box including a wing boss having a bore therein;
    a first rotatable wing held loosely to said wing boss by a fastener, said first rotatable wing for mounting said electrical box to a first thickness of wallboard;
    a second rotatable wing for optional use in place of said first rotatable wing, said second rotatable wing for mounting said electrical box to a second thickness of wallboard;

said rotatable wings including a front surface, a rear surface, and a stop arm extending from said rear surface; and two flanges extending from opposing sides of the sidewall.

13. The sconce box assembly of claim 12, further comprising a fixture boss extending from said front surface of said back wall.

14. The sconce box assembly of claim 13, wherein said rotatable wings further comprise a first corner and two opposing corners; and an aperture in said first corner, said aperture in said first corner enabling rotation of said rotatable wings in a first direction to place said rotatable wings in a retracted position wherein said wings are retracted within said sidewall of said electrical box.

15. The sconce box assembly of claim 12, wherein said stop arm of said first rotatable wing further comprises a first side and a second side.

16. The sconce box assembly of claim 12, wherein said second rotatable wing comprises a base portion and an end portion.

17. The sconce box assembly of claim 16, wherein said end portion of said second rotatable wing is offset a distance from said base portion.

18. A method of securing a sconce to a wall, including providing a sconce box assembly including an electrical box having a sidewall, a back wall, wing bosses including bores therein on said sidewall, and two flanges extending from opposing sides of said sidewall;

providing a rotatable wing held loosely to said wing boss by a fastener;

rotating said rotatable wing in a first direction until said wing is within the sidewall of the electrical box;

forming a substantially circular hole in the wall;

inserting said electrical box into said hole and pulling said electrical box forward until said flanges seat flush on a rear surface of the wall;

rotating said rotatable wing in a second direction until said wing is outside the sidewall of the electrical box and has drawn said electrical box tight against the wall; and securing the sconce to the electrical box.

19. The method of claim 18, which further comprises providing a second rotatable wing for optional use in place of said rotatable wing, said second rotatable wing for mounting said electrical box to a second thickness of wallboard.

20. The method of claim 19, which further comprises providing a base portion and an end portion on said second rotatable wing; and offsetting said end portion of said second rotatable wing a distance from said base portion.

* * * * *